United States Patent
Carey et al.

(10) Patent No.: US 12,306,805 B2
(45) Date of Patent: May 20, 2025

(54) DYNAMICALLY RESIZING ROOT NODES OF HIERARCHICAL DATA STRUCTURES

(71) Applicant: MICROSOFT TECHNOLOGY LICENSING, LLC, Redmond, WA (US)

(72) Inventors: Omar Carey, Redmond, WA (US); Rajsekhar Das, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/344,408

(22) Filed: Jun. 29, 2023

(65) Prior Publication Data
US 2025/0004993 A1    Jan. 2, 2025

(51) Int. Cl.
*G06F 16/185* (2019.01)
*G06F 16/13* (2019.01)
*G06F 16/901* (2019.01)

(52) U.S. Cl.
CPC ........... *G06F 16/185* (2019.01); *G06F 16/13* (2019.01); *G06F 16/9027* (2019.01)

(58) Field of Classification Search
CPC ...... G06F 16/122; G06F 16/13; G06F 16/185; G06F 16/211; G06F 16/2228; G06F 16/2246; G06F 16/282; G06F 16/322; G06F 16/9027; G06F 3/0644; G06F 3/067
See application file for complete search history.

(56) References Cited

U.S. PATENT DOCUMENTS

| 11,216,416 B2 | 1/2022 | Carey et al. | |
| 2012/0047181 A1* | 2/2012 | Baudel | G06F 16/2246 707/E17.012 |
| 2012/0096216 A1* | 4/2012 | Lee | G06F 12/0246 711/E12.008 |
| 2019/0095457 A1* | 3/2019 | Gupta | G06F 16/13 |
| 2021/0349850 A1* | 11/2021 | Carey | G06F 16/182 |
| 2022/0414102 A1* | 12/2022 | Shatsky | G06F 16/24552 |

(Continued)

OTHER PUBLICATIONS

Anonymous, "B+ tree—Wikipedia", Retrieved from the Internet: URL:https://web.archive.org/web/20230615011947/https://en.wikipedia.org/wiki/B+_tree, retrieved on Sep. 9, 2024, 10 pages.

(Continued)

*Primary Examiner* — Robert W Beausoliel, Jr.
*Assistant Examiner* — Cheryl M Shechtman
(74) *Attorney, Agent, or Firm* — Newport IP, LLC; Jacob P. Rohwer

(57) ABSTRACT

A processing system dynamically adjusts the size of root nodes in hierarchical data structures, such as B+ trees. Upon creation, a root node has a predefined initial size. When a request is received to insert a new record, a determination is made as to whether the size of the root node has reached a predefined maximum size. If the root node has not reached the predefined maximum size, the size of the root node is increased to accommodate the new record and the new record is added to the root node. If the root node has reached the predefined maximum size, one or more new child nodes are created, and records are moved from the root node to the new child nodes. The size of the root node is then reduced to a predefined minimum size.

18 Claims, 13 Drawing Sheets

(56) References Cited

U.S. PATENT DOCUMENTS

2023/0237029 A1\* 7/2023 Tal ........................ G06F 16/215
　　　　　　　　　　　　　　　　　　　707/692

OTHER PUBLICATIONS

Anonymous, "B+ Tree Insertion—javatpoint", Retrieved from the Internet: URL:https://web.archive.org/web/20230607213419/https://www.javatpoint.com/bplus-tree-insertion, retrieved on Sep. 10, 2024, 10 pages.
International Search Report and Written Opinion received for PCT Application No. PCT/US2024/034568, (Ms# 413326-PCT01) mailed on Oct. 4, 2024, 14 pages.
Kim, et al., "IPLFS: Log-Structured File System without Garbage Collection", USENIX The Advanced Computing Systems Association, Jul. 2022, 17 pages.

\* cited by examiner

DYNAMICALLY RESIZING ROOT NODES OF HIERARCHICAL DATA STRUCTURES

BACKGROUND

B+ trees are self-balancing hierarchical data structures with a variable but often large number of children per node. B+ trees frequently have a relatively high branching factor and, as a result, also have a relatively high fanout (i.e., the number of pointers to child nodes from a root or internal node) when compared to other types of tree data structures, such as binary search trees. In general, a tree data structure with a higher fanout has fewer internal nodes and, as a result, requires fewer node traversals to locate a leaf node storing a desired record than a tree data structure having a lower fanout. This property of B+ trees makes them highly suitable for storing data requiring efficient retrieval, such as filesystem metadata.

One disadvantage of using B+ trees to store filesystem metadata results from the fact that the root node of a B+ tree is mostly empty after a push operation moves records from the root node. For example, 16K of space may be initially allocated for a root node in a B+ tree. When the root node reaches its allocated capacity, a push operation occurs that creates two child nodes and moves records from the root node into the new child nodes. Thereafter, each of the new child nodes will contain approximately 8K of data from the root node. The root node, however, will contain only keys and pointers that reference the new child nodes even though 16K of space was previously allocated to it. This results in nearly 16K of allocated but unused storage in the root node. This problem is exacerbated on storage volumes created by filesystems that cause B+ trees to frequently perform push operations.

SUMMARY

Technologies are disclosed herein for dynamically resizing root nodes of hierarchical data structures, such as B+ trees. Through implementations of the disclosed technologies, root nodes of hierarchical data structures, such as B+ trees, that are utilized to store filesystem metadata can be dynamically resized in order to reduce the amount of allocated but unused space in the root nodes. For example, the size of a root node of a B+ tree can be dynamically reduced to a minimum size following a push operation, thereby reducing the amount of allocated but unused storage consumed by the root node. Dynamically resizing root nodes of B+ trees in the disclosed manner can also speed up retrieval operations by improving the locality of reference for records stored in the root node of a B+ tree. Other technical benefits not specifically mentioned herein might also be realized through implementations of the disclosed subject matter.

In order to provide aspects of the functionality disclosed herein, a processing system maintains a filesystem for a storage volume. The filesystem utilizes B+ trees to store filesystem metadata for the storage volume. For example, in an embodiment, the filesystem utilizes B+ trees to store streams run tables that specify a mapping between virtual cluster numbers ("VCNs") and logical cluster numbers ("LCNs") for files stored on the storage volume. In this embodiment, the filesystem also utilizes B+ trees that define file tables that store metadata for the files on the storage volume. The B+ trees defining the file tables are embedded in directory tables and the B+ trees defining the streams run tables are embedded in file tables, according to embodiments.

When a B+ tree utilized by the filesystem is created, a root node of the B+ tree is created that has a predefined initial size. When a request is received to insert a new record into the B+ tree, a determination is made as to whether the root node has reached a predefined maximum size. If the size of the root node has not yet reached the predefined maximum size, the size of the root node is increased to accommodate the new record. The new record is then added to the root node. In this manner, the root node grows dynamically as new records are added until it reaches the predefined maximum size.

If the root node of the B+ tree has reached the predefined maximum size when a request to add a new record is received, one or more new child nodes (e.g., internal nodes or leaf nodes) of the root node are created in the B+ tree and records are moved from the root node to the newly created child nodes. The size of the root node of the B+ tree is then reduced to a predefined minimum size, for example the minimum size required to store the new record. In this manner, the size of the root node can be dynamically reduced to eliminate allocated but unused space in the root node following a push operation.

The above-described subject matter is implemented as a computer-controlled apparatus, a computer-implemented method, a processing system, or as an article of manufacture such as a computer readable medium in various embodiments disclosed herein. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for dynamically resizing root nodes of hierarchical data structures, such as B+ trees. As discussed briefly above, implementations of the disclosed technologies can reduce the amount of unused space allocated to root nodes. For example, the size of a root node of a B+ tree storing filesystem metadata can be dynamically reduced to a minimum size following a push operation, thereby reducing the amount of unused space allocated to the root node. As also discussed briefly above, dynamically resizing root nodes of B+ trees in the disclosed manner can also speed up retrieval operations by improving the locality of reference for records stored in the root node of the B+ tree. Other technical benefits not specifically mentioned herein might also be realized through implementations of the disclosed subject matter.

Figure 1:
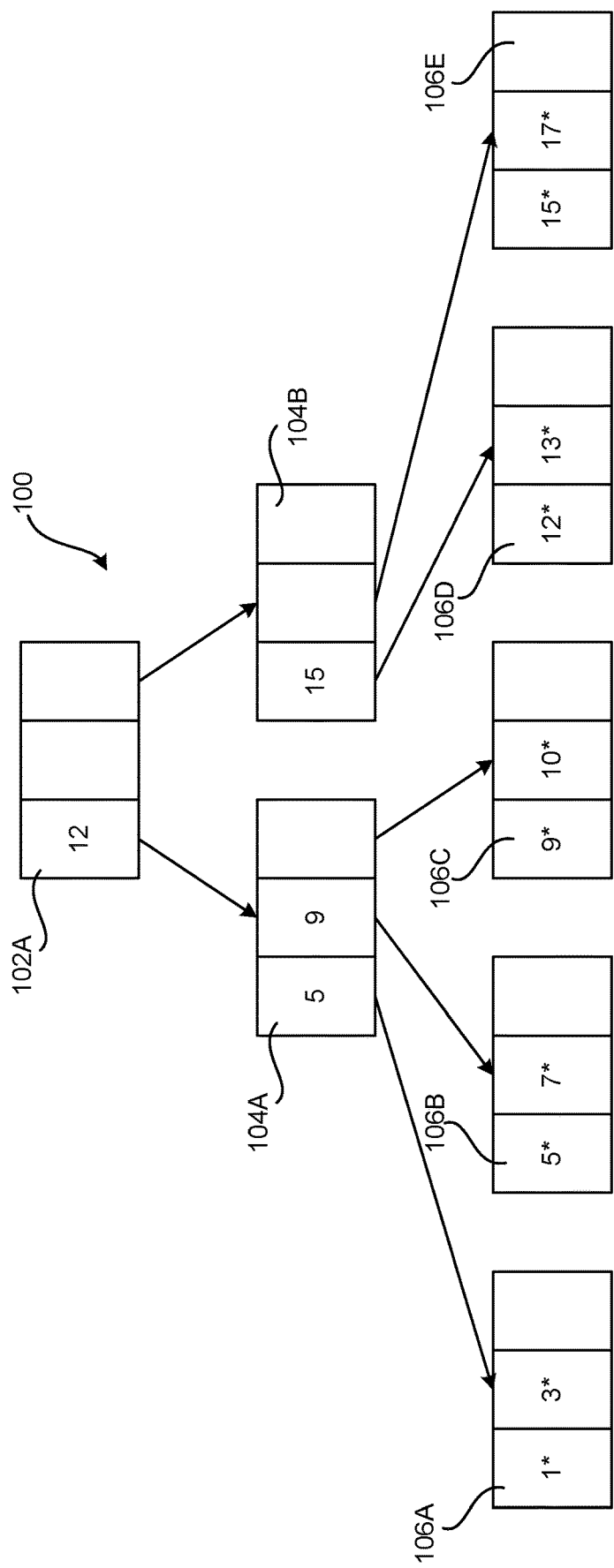
FIG. 1 is a data structure diagram illustrating aspects of an example B+ tree.

Prior to describing the various mechanisms disclosed herein for dynamically resizing root nodes of hierarchical data structures, such as B+ trees, a brief overview of B+ trees will be provided with reference to the illustrative B+ tree 100 shown in FIG. 1. As discussed briefly above, a B+ tree, such as the B+ tree 100, is a self-balancing hierarchical data structure with a variable, but often large, number of children per node. A B+ tree includes a root node and might also include additional internal nodes and leaf nodes.

In general, B+ trees represent a range of keys, with leaf nodes including records for key-value mappings corresponding to at least a subset of an assigned range. The root node of a B+ tree represents the entire range of keys covered by the tree. Internal nodes in a B+ tree, if any, represent a sub-interval of the range of keys covered by the B+ tree. Each leaf node in a B+ tree stores zero or more records for sets of key value pairs.

B+ trees generally have a branching factor b, which is defined as the maximum number of child nodes to which any internal nodes are permitted to point. In some implementations of B+ trees, internal nodes are constrained to have a number of children m, that is defined as $[b/2]<=m<=b$, and the root node is constrained to have a number of children that is defined as $2<=m<=b$.

Leaf nodes in a B+ tree have no children, but in some implementations are constrained to store a number of keys k and their associated mappings that is defined as $[b/2]<=k<=b$. In some implementations, the root node of a B+ tree is permitted to represent one or more key-value pairs if it has no children. In this case, the root node is constrained to represent a number of keys k that is defined as $1>=k<=b-1$.

To illustrate, the example B+ tree 100 shown in FIG. 1 includes key-value mappings for keys numbered 1, 3, 5, 7, 9, 10, 12, 13, 15, and 17. The B+ tree 100 includes a root node 102A that represents the entire key range (e.g., 0-∞), divided into subintervals 0-11 and 12-∞. The internal node 104A represents the subinterval of keys 0-11, divided further into subintervals 0-4, 5-8, and 9-11. The internal node 104B represents the subinterval of keys 12-∞, divided further into subintervals 12-14 and 15-∞.

The leaf node 106A corresponds to subinterval 0-4 and stores key-value mappings for keys 1 and 3, the leaf node 106B corresponds to subinterval 5-8 and stores key-value mappings for keys 5 and 7, the leaf node 106C corresponds to subinterval 9-11 and stores key-value mappings for keys 9 and 10, the leaf node 106D corresponds to subinterval 12-14 and stores key-value mappings for keys 12 and 13, and the leaf node 106E corresponds to subinterval 15-0 and stores key-value mappings for keys 15 and 17. The asterisks shown in leaf nodes 106A-106E indicate that each key is associated with a mapping in these leaf nodes.

In order to locate a given key-value mapping within the B+ tree 100, a search is made for a requested key progressively down the B+ tree 100, starting at the root node 102A and following the keys specified by the internal nodes 104 in order to locate a leaf node 106 corresponding to an appropriate subinterval. For example, searching for the key 5 at root node 102A leads to internal node 104A (e.g., corresponding to subinterval 0-11), and searching for key 5 at internal node 104A leads to leaf node 106B (e.g., corresponding to subinterval 5-8). Here, key 5 and its associated mapping are found in leaf node 106B.

In another example, searching for key 14 beginning at the root node 102A leads to internal node 104B (e.g., corresponding to subinterval 12-0), and searching for key 14 at internal node 104B leads to leaf node 106D (e.g., corresponding to subinterval 12-14). Here, key 14 is not found in the B+ tree 100.

As discussed above, B+ trees, such as the B+ tree 100 shown in FIG. 1, are frequently used to represent data structures (e.g., tables) storing records (e.g., rows) that include one or more key-value pair mappings. B+ trees often have a relatively high branching factor (e.g., on the order of 100's or more) and, as a result, have a relatively high fanout when compared to other types of tree data structures such as binary search trees, which are limited to two children per node.

A tree data structure having a higher fanout has fewer internal nodes and thus requires fewer node traversals to locate a leaf node storing a given key-value mapping than a tree data structure having a lower fanout. This characteristic makes B+ trees highly suitable for, among other things, representing data structures that store mappings into mass storage devices or pools of mass storage and other types of filesystem metadata.

As also discussed above, one technical disadvantage of using B+ trees to store filesystem metadata stems from the fact that root nodes in B+ trees become mostly empty immediately following a push operation that moves records out of the root node. For instance, 16K of space may be initially allocated for a root node in a B+ tree. When the root node reaches its capacity, a push operation will occur that creates child nodes of the root node and moves records from the root node to the new nodes. Thereafter, each of the new child nodes will contain approximately 8K of data taken from the root node. The root node, however, will contain only keys and the pointers that reference the two new nodes even though 16K of space was previously allocated for the root node. This can result in a significant amount of allocated but unused storage, particularly on storage volumes created by filesystems that cause B+ trees to frequently perform push operations.

Figure 2:
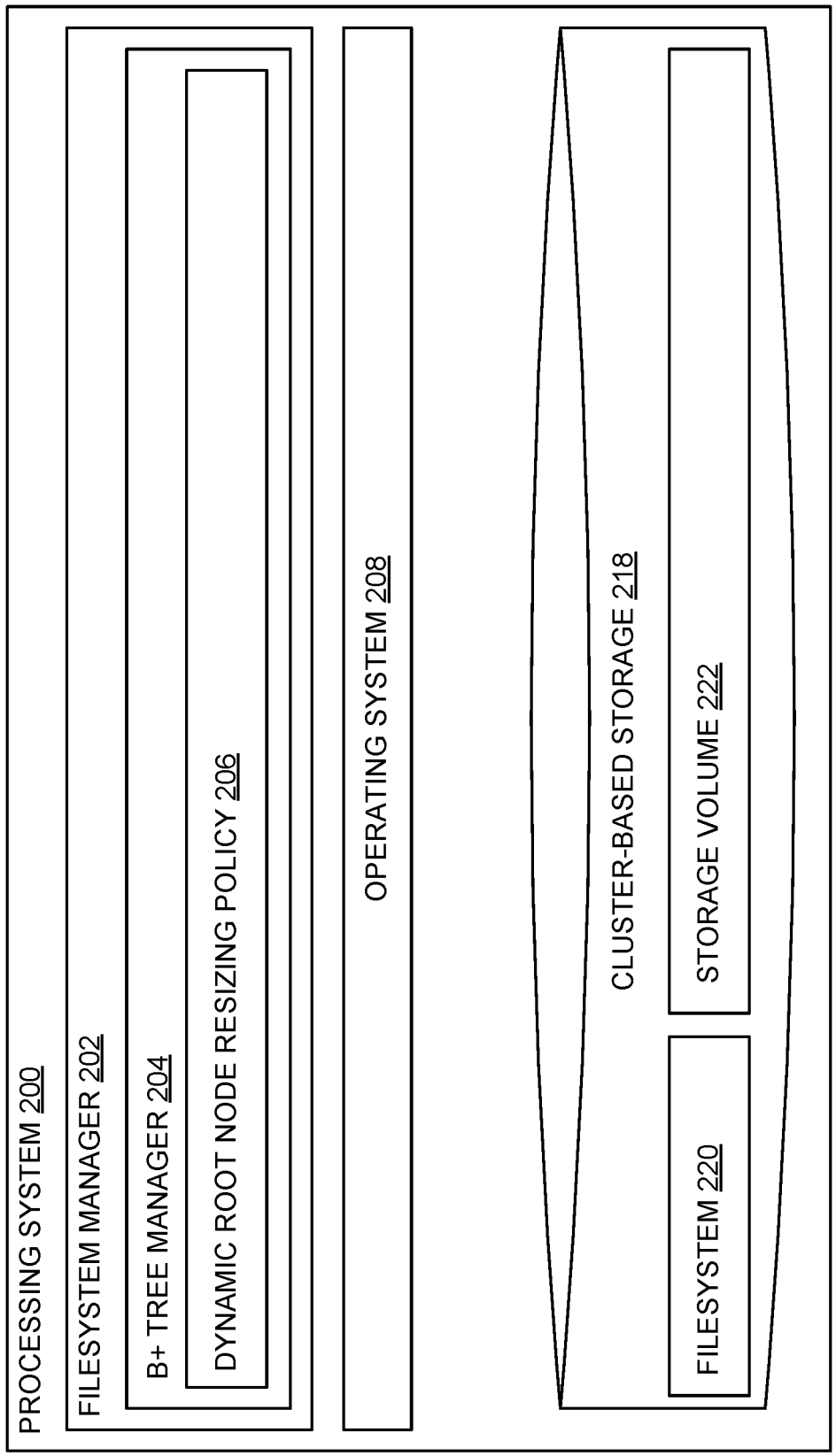
FIG. 2 is a computing architecture diagram showing aspects of an example computer architecture for a processing system that is capable of implementing the functionality disclosed herein for dynamically resizing root nodes of hierarchical data structures.

FIG. 2 is a computing architecture diagram showing aspects of an example computer architecture for a processing system 200 that is capable of implementing the functionality disclosed herein for dynamically resizing root nodes of B+ trees storing filesystem metadata. As illustrated, the processing system 200 includes a filesystem manager 202, an operating system ("OS") 208, and cluster-based storage 218 (e.g., a physical or logical storage device). Cluster-based storage 218 includes a storage volume 222 storing physical or logical storage clusters that are referenced/organized by a filesystem 220. The filesystem 220 corresponds to, or includes, filesystem metadata that organizes the storage volume 222 into directories, files, and the like.

While the embodiments disclosed herein reference a processing system 200 that organizes and references a storage volume 222 in cluster-based storage 218, this is for illustrative purposes only. The filesystem manager 202 disclosed herein can be utilized with storage systems utilizing other units of storage (e.g., blocks) and can be applied to a broad variety of dataset types and uses beyond filesystems and volumes.

The filesystem manager 202 executes on the OS 208 and manages the filesystem 220, including maintaining data structures on the cluster-based storage 218 that include filesystem metadata defining the contents of the storage volume 222. In the illustrated example, the filesystem manager 202 includes a variety of sub-components, including a B+ tree manager 204. As will be described in greater detail below, the B+ tree manager 204 manages a collection of B+ trees utilized to represent the filesystem 220. The B+ trees stored by the B+ tree manager 204 include records defining a mapping between a key and a corresponding value or between a range of keys and a corresponding range of values. The B+ tree manager 204 manages the storage of these records within nodes of the B+ trees.

Although not illustrated in FIG. 2, the filesystem manager 202 can also include a request manager that manages key-based requests (e.g., queries, write requests, and read requests) using the set of B+ trees (e.g., based on a requested key) such as, for example, identifying a key-value mapping if there is a record overlapping a requested key. The filesystem manager 202 includes other types of functionality and other components not shown in FIG. 2, in other embodiments.

As shown in FIG. 2, the filesystem manager 202 consumes a dynamic root node resizing policy 206. The dynamic root node resizing policy 206 defines an initial root size, a maximum root size, and a minimum root size for root nodes in the B+ trees managed by the filesystem manager 202, in an embodiment. Details regarding the utilization of the dynamic root node resizing policy 206 by the filesystem manager 202 will be provided below.

The components of the example processing system 200 illustrated in FIG. 2 represent components for implementing the disclosed functionality, according to an embodiment disclosed herein. The depicted components, including their identities, sub-components, and configuration, are presented merely as an aid in describing the functionality disclosed herein. The illustrated components are examples for implementing the disclosed functionality using a processing system 200. Configurations of hardware and software other than that shown in FIG. 2 can be utilized to implement the disclosed functionality in other embodiments.

Figure 3:
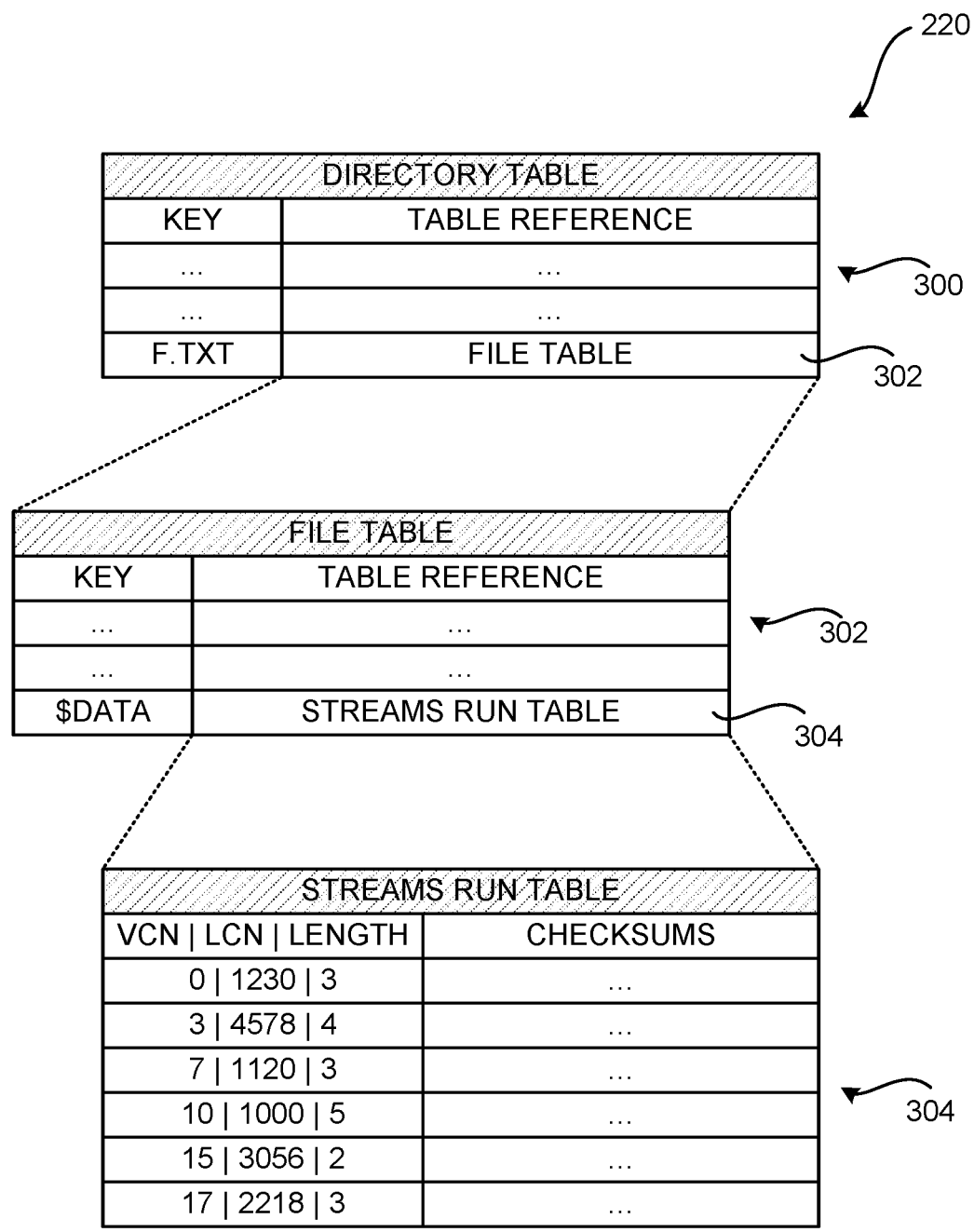
FIG. 3 is a data structure diagram showing aspects of several example tables in a filesystem.

FIG. 3 is a data structure diagram showing aspects of several example tables in an illustrative filesystem 220 maintained by the filesystem manager 202, according to an embodiment. In the example shown in FIG. 3, the filesystem manager 202 maintains a directory table 300, a file table 302, and a streams run table 304. The directory table 300 stores filesystem metadata for a directory in the filesystem 220. For instance, in the illustrated example, the directory table 300 stores a file table 302 for each file stored in the corresponding directory on the storage volume 222. In an embodiment, the file tables 302 are embedded in the directory table 300.

A file table 302 stores filesystem metadata for a file stored on the storage volume 222 such as file name, security descriptors, timestamps (e.g., file creation time and last file alteration time), and file permissions (e.g., read-only, hidden, and system). As shown in FIG. 3, a file table 302 also stores a streams run table 304. In an embodiment, the streams run table 304 for a file is embedded in the file table 302 for the file.

The streams run table 304 specifies a mapping between VCNs and LCNs in cluster-based storage 218 for files stored on the storage volume 222. Thus, in the example shown in FIG. 3, the illustrative streams run table 304 represents one state of VCN to LCN mappings for a file stored within cluster-based storage 218.

In the illustrated embodiment, the streams run table 304 includes columns corresponding to a start VCN, a start LCN, and a length which, when taken together, maps a range of one or more VCNs to a corresponding range of one or more LCNs (e.g., VCNs 0-2 to LCNs 1230-1232, VCNs 3-6 to LCNs 4578-4581, and so on). As indicated by the additional column containing ellipses, in some embodiments the streams run table 304 includes additional information such as a checksum of data stored within the corresponding range of LCNs.

FIGS. 4A-4G are data structure diagrams illustrating aspects of the creation of an example B+ tree 400 utilized to represent the streams run table 304 in the example filesystem 220 shown in FIG. 3. As discussed briefly above, the filesystem manager 202 utilizes B+ trees to store filesystem metadata such as the directory table 300, the file table 302, and the streams run table 304 shown in FIG. 3 and described above. While FIGS. 4A-4G illustrate the creation of a B+ tree 400 storing an example streams run table 304, the described mechanism can be utilized to create B+ trees corresponding to other tables in the filesystem 220, such as the file table 302 and the directory table 300.

Figure 4A:
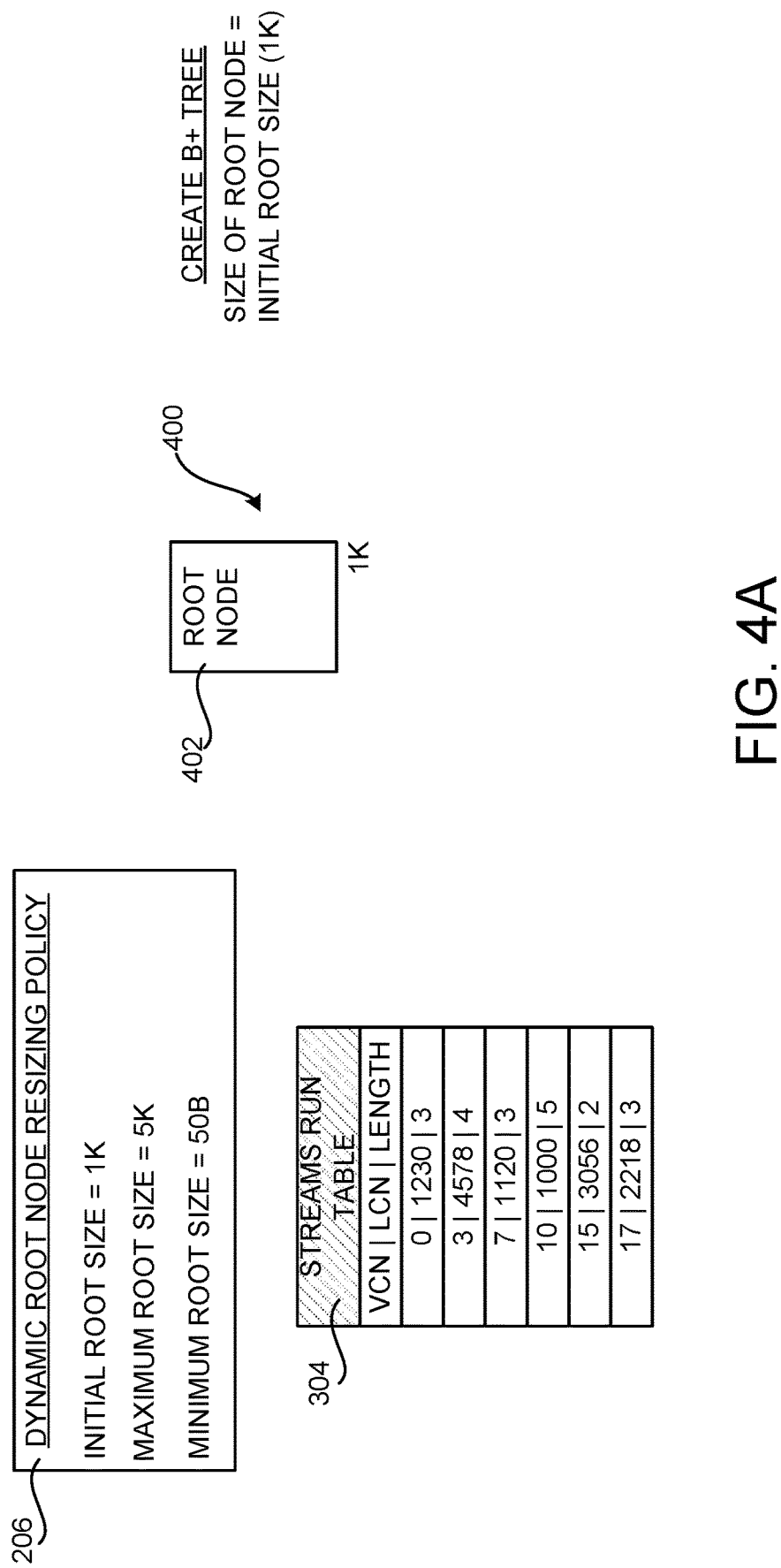
FIG. 4A is a data structure diagram illustrating aspects the creation of an example B+ tree utilized to represent a streams run table 304 in the filesystem shown in FIG. 3.
Figure 4B:
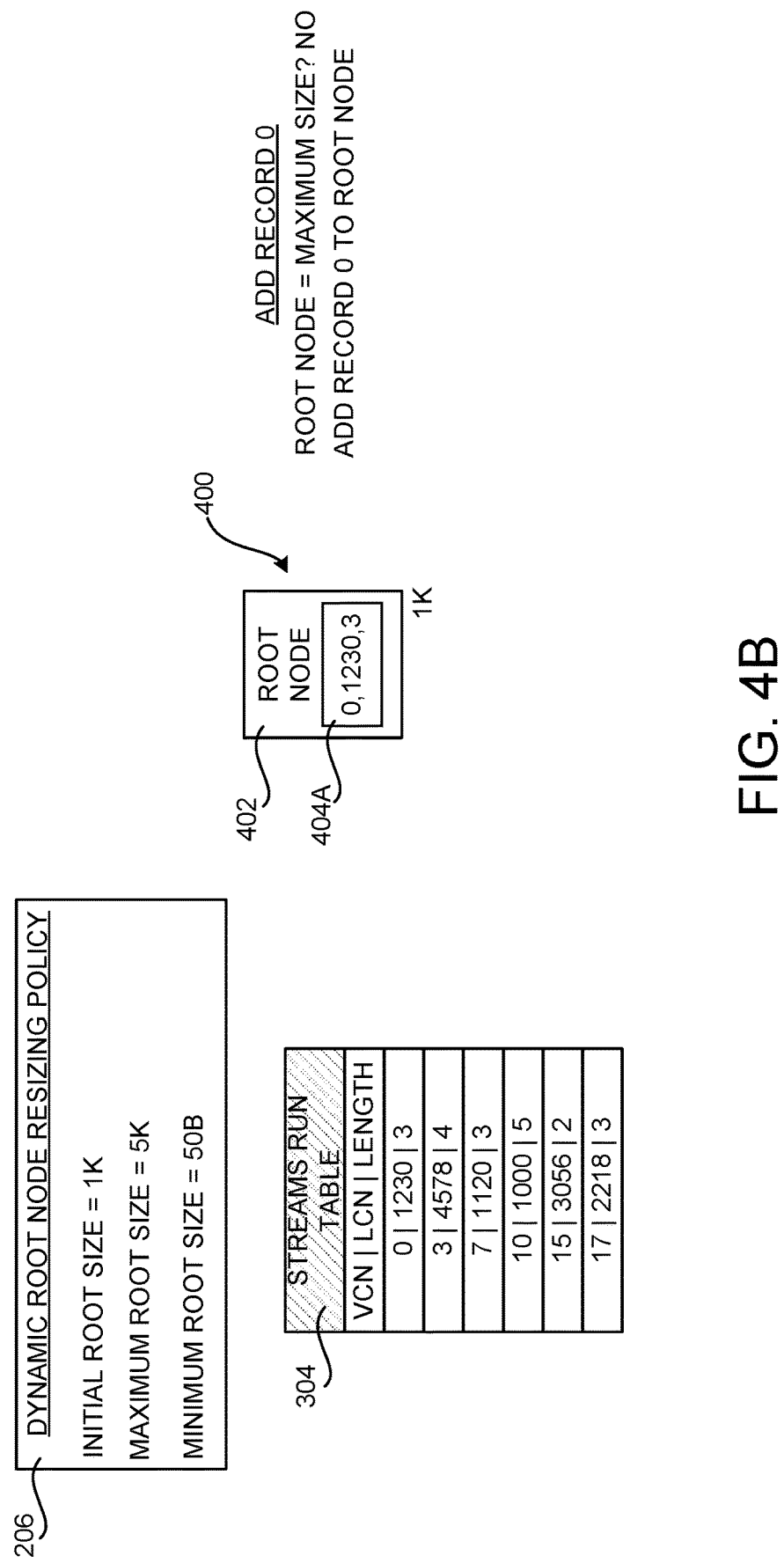
FIG. 4B is a data structure diagram showing additional aspects of the example B+ tree shown in FIG. 4A.

As shown in FIG. 4A, when the B+ tree 400 is created, the B+ tree manager 204 allocates a predefined initial amount of the cluster-based storage 218 for the root node 402 of the B+ tree 400. As discussed above, the predefined initial size is defined by the dynamic root node resizing policy 206. In the example shown in FIGS. 4A-4G, the dynamic root node resizing policy 206 specifies an initial root size of 1 kilobyte (K). Consequently, a root node 402 has been created for the B+ tree 400 and 1K has been allocated to the root node 402. The sizes set forth by the dynamic root node resizing policy 206 in the example shown in FIGS. 4A-4G have been selected for ease of discussion. Other sizes can be utilized in other embodiments.

When the B+ tree manager 204 receives a request to insert a new record 404 into the B+ tree 400, the B+ tree manager 204 determines whether the root node 402 of the B+ tree 400 has reached a predefined maximum size. The new record may be either a leaf record, which is a record inserted into the root node 402 prior to a push operation, or a director record, which is a record inserted into the root node 402 following a push operation. As discussed above, the predefined maximum size is specified by the dynamic root node resizing policy 206, in an embodiment. In the example shown in FIGS. 4A-4G, the predefined maximum size for the root node 402 has been specified as 5K.

If the B+ tree manager 204 determines that the root node 402 has not yet reached the predefined maximum size, the size of the root node 402 is increased to accommodate the new record 404, if necessary, and the new record 404 is then added to the root node 402. In the example shown in FIG. 4B, for instance, a new record 404A is to be added to the B+ tree 400 that maps key 0 to the value 1230 with a length of 3 (e.g., the first row in streams run table 304). In this case, the root node 402 has not yet reached the predefined maximum size of 5K and, therefore, the record 404A is added directly to the root node 402.

Figure 4C:
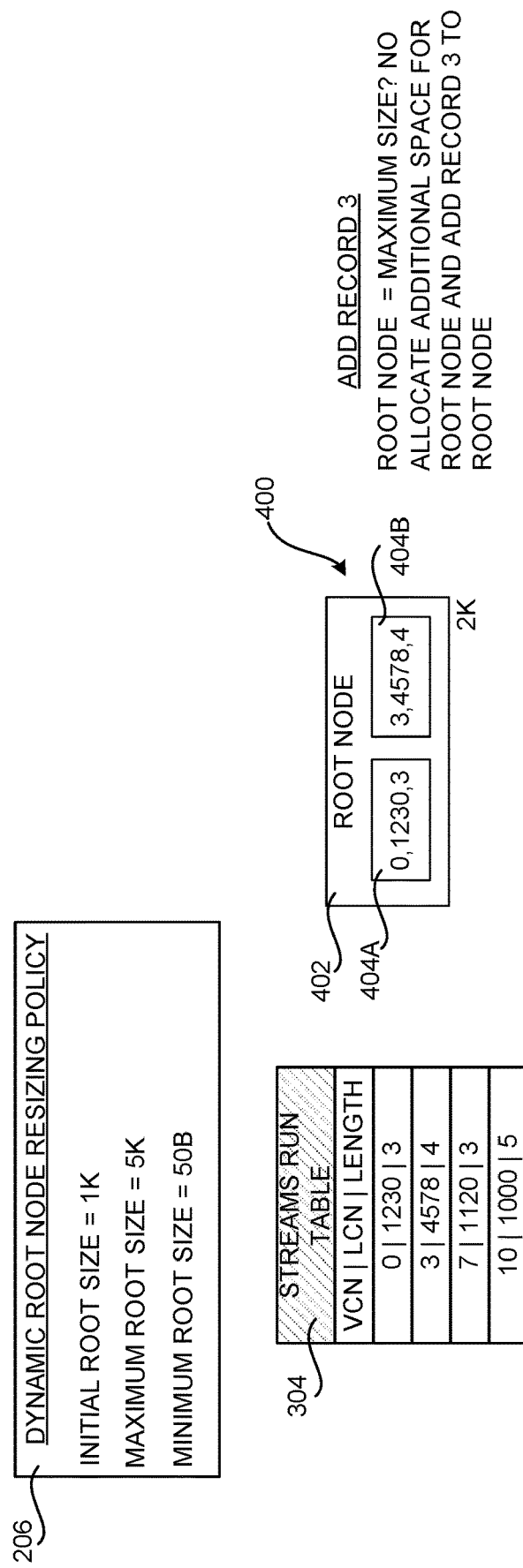
FIG. 4C is a data structure diagram showing additional aspects of the example B+ tree shown in FIGS. 4A-4B.

The B+ tree manager 204 makes a determination as to whether the root node 402 has reached the predefined maximum size each time a request is received to add a new record 404 to the B+ tree 400. As shown in FIG. 4C, for instance, such a determination is made by the B+ tree manager 204 when it receives a request to add the record 404B, which maps key 3 to the value 4578 with a length of 4 (e.g., the second row in streams run table 304). In this case, the root node 402 has not yet reached the predefined maximum size of 5K and, accordingly, the B+ tree manager 204 increases the size of the root node 402 to accommodate the record 404B and adds the record 404B to the root node 402.

Figure 4D:
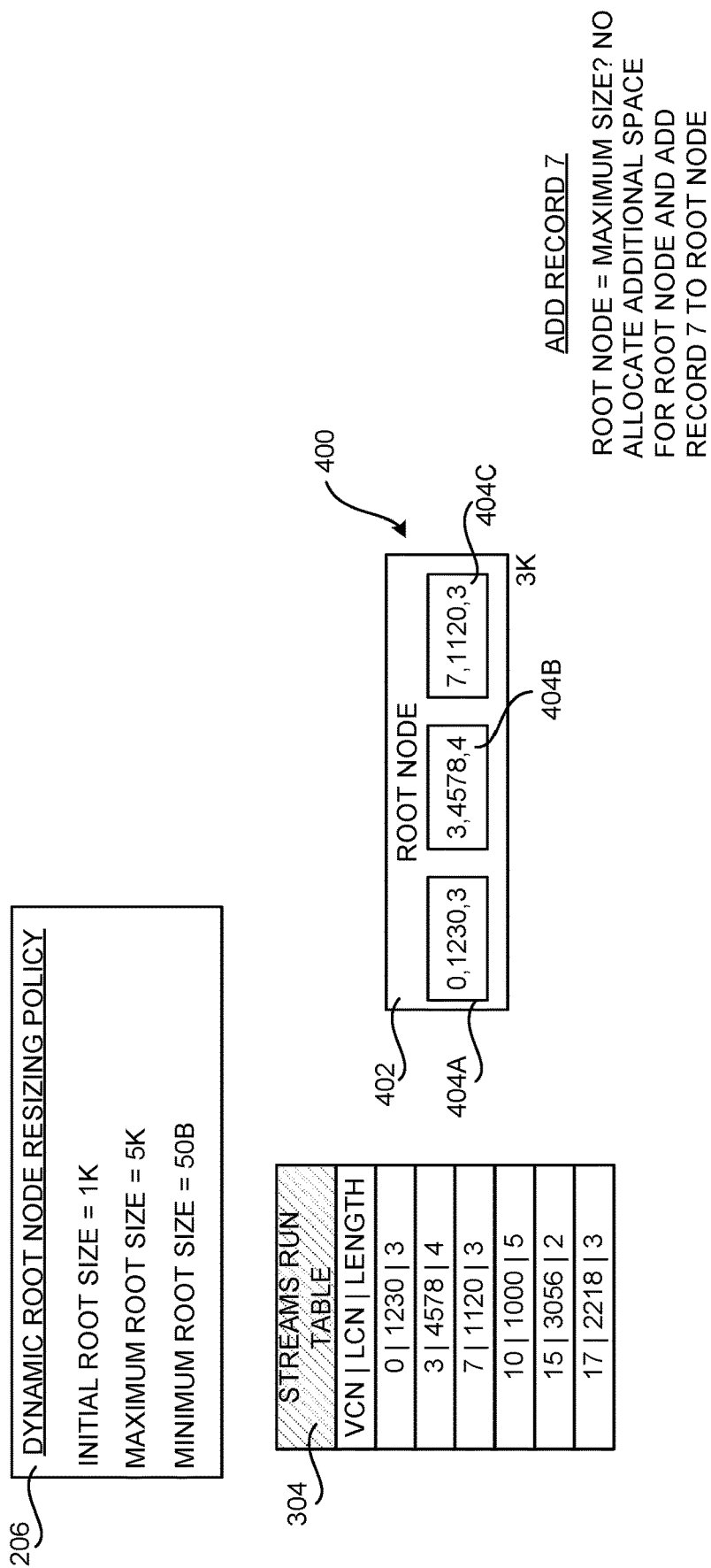
FIG. 4D is a data structure diagram showing additional aspects of the example B+ tree shown in FIGS. 4A-4C.
Figure 4E:
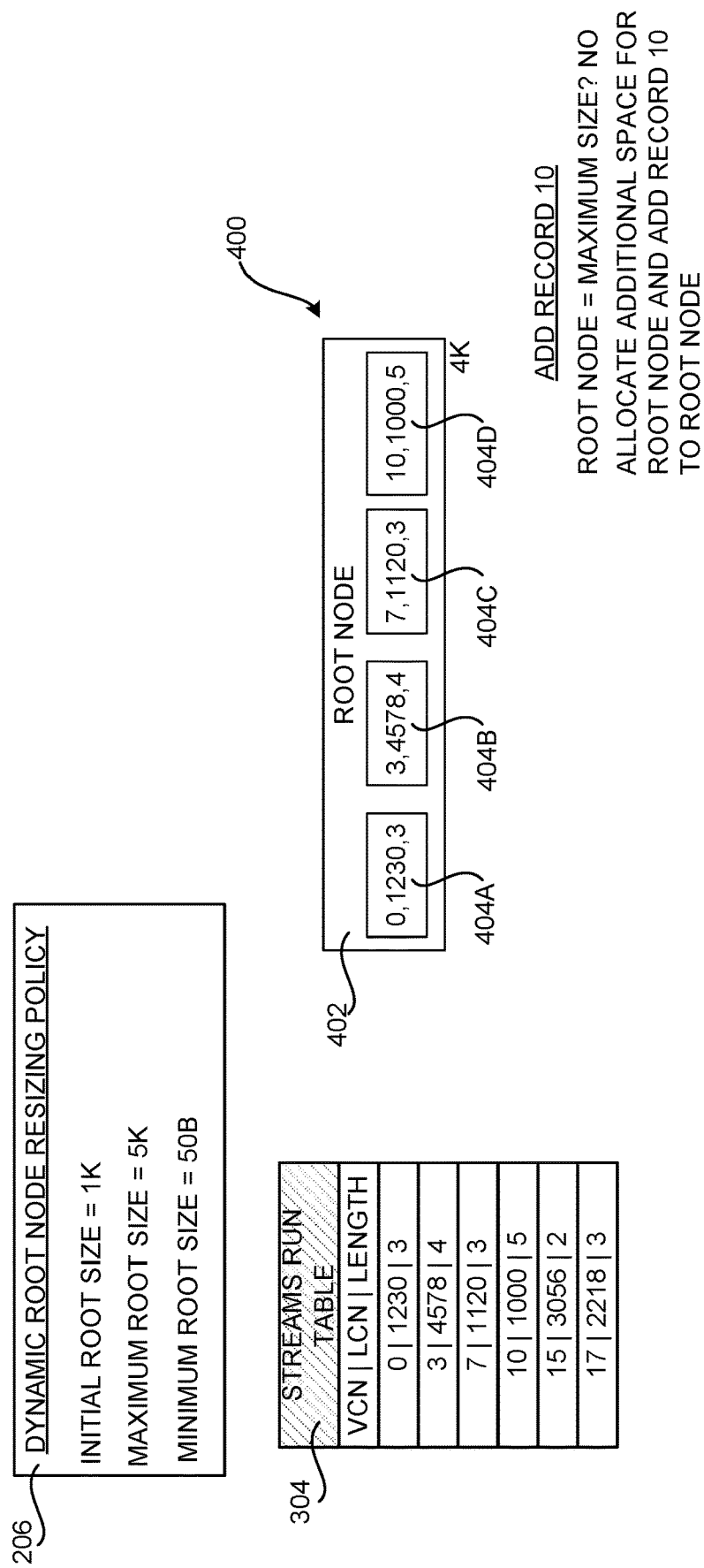
FIG. 4E is a data structure diagram showing additional aspects of the example B+ tree shown in FIGS. 4A-4D.
Figure 4F:
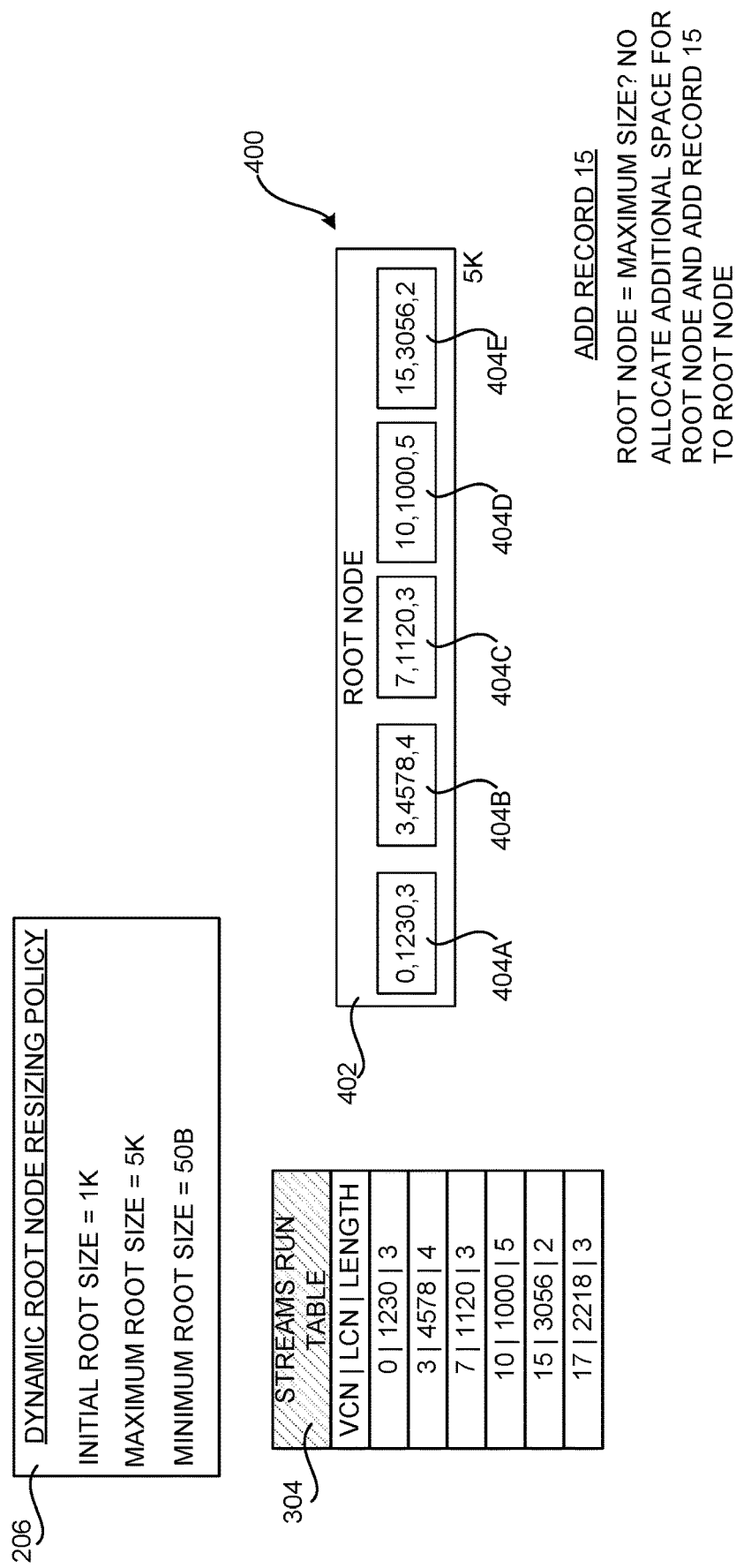
FIG. 4F is a data structure diagram showing additional aspects of the example B+ tree shown in FIGS. 4A-4E.

As shown in FIGS. 4D-4F, the process described above continues in a similar manner as the records 404C, 404D, and 404E, corresponding to rows three through six in the streams run table 304, are added to the root node 402. In this manner, the root node 402 grows dynamically as new records are added to the B+ tree 400 until it reaches the predefined maximum size specified by the dynamic root node resizing policy 206. This enables storage of the maximum number of records in the root node 402 prior to performing a push operation, thereby improving locality of reference for the records stored in the root node 402.

If the root node 402 of the B+ tree 400 has reached the predefined maximum size when a request to add a new record 404 to the B+ tree 400 is received, the B+ tree manager 204 performs a push operation that adds one or more new child nodes 406 (e.g., internal nodes or leaf nodes) of the root node 402 to the B+ tree 400. The push operation also moves records 404 from the root node 402 to the newly created child nodes 406.

After the records 404 have been moved out of the root node 402, the B+ tree manager 204 reduces the size of the root node 402 of the B+ tree 400 to a predefined minimum size, such as a minimum size required to store the new record. As discussed above, the predefined minimum size is specified by the dynamic root node resizing policy 206, in an embodiment. In this manner, the size of the root node 402 is dynamically reduced to eliminate allocated but unused space in the root node 402 following a push operation.

Figure 4G:
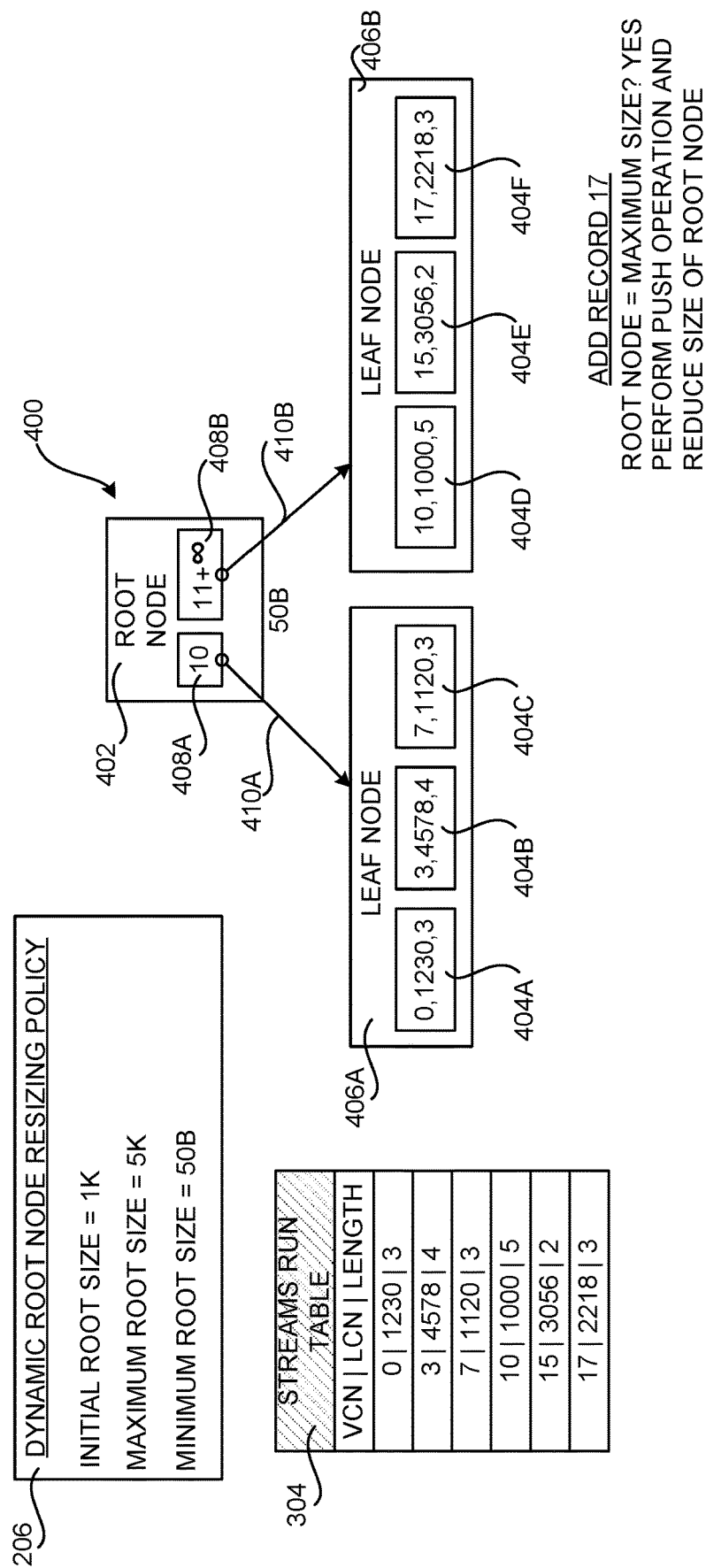
FIG. 4G is a data structure diagram showing additional aspects of the example B+ tree shown in FIGS. 4A-4F.

In the example shown in FIG. 4G, the B+ tree manager 204 has received a request to add a new record 404F corresponding to the sixth row in the streams run table 304 to the B+ tree 400. In response thereto, the B+ tree manager 204 determines if the root node 402 has reached the predefined maximum size specified by the dynamic root node resizing policy 206.

In the illustrated example, the root node 402 has reached the predefined maximum size (5K). Accordingly, the B+ tree manager 204 creates two new child nodes, the leaf nodes 406A and 406B in this case, of the root node 402. The B+ tree manager 204 also moves records 404 from the root node 402 to the newly created leaf nodes 406A and 406B. In particular, the B+ tree manager 204 moves the records 404A, 404B, and 404C to the leaf node 406A, and moves the records 404D and 404E to the leaf node 406B. The B+ tree manager 204 adds the new record 404F to the leaf node 406B.

The B+ tree manager 204 also reduces the size of the root node 402 to the predefined minimum size specified by the dynamic root node resizing policy 206. In the illustrated example, the predefined minimum size is 50 bytes. In this manner, the amount of storage allocated to the root node 402 of the B+ tree is reduced from 5K to 50 bytes in the illustrated example.

In order to complete the illustrated push operation, the B+ tree manager 204 adds director records 408A and 408B to the root node 402. The director record 408A provides a reference 410A to the leaf node 406A for values 0-9 and the director record 408B provides a reference 410B to the leaf node 406B for values 0-∞.

Following the operations described above, leaf node 406A stores three records: record 404A mapping key 0 to the value 1230 with a length of 3 (e.g., the first row in streams run table 304); record 404B mapping key 3 to the value 4578 with a length of 4 (e.g., the second row in streams run table 304); and record 404C mapping key 7 to the value 1120 with a length of 3 (e.g., the third row in streams run table 304). Leaf node 406B also stores three records following the operations described above: record 404D mapping key 10 to the value 1000 with a length of 5 (e.g., the fourth row in streams run table 304); record 404E mapping key 15 to the value 3056 with a length of 2 (e.g., the fifth row in streams run table 304); and record 404F mapping key 17 to the value 2218 with a length of 3 (e.g., the sixth row in streams run table 304).

The process described above for increasing the size of the root node 402 is repeated as additional director records are added to the root node 402 up to the predefined maximum size. Once the root node 402 reaches the predefined maximum size, a push operation will occur and the size of the root node 402 will once again be dynamically modified to the predefined minimum size in the manner described above.

Figure 5:
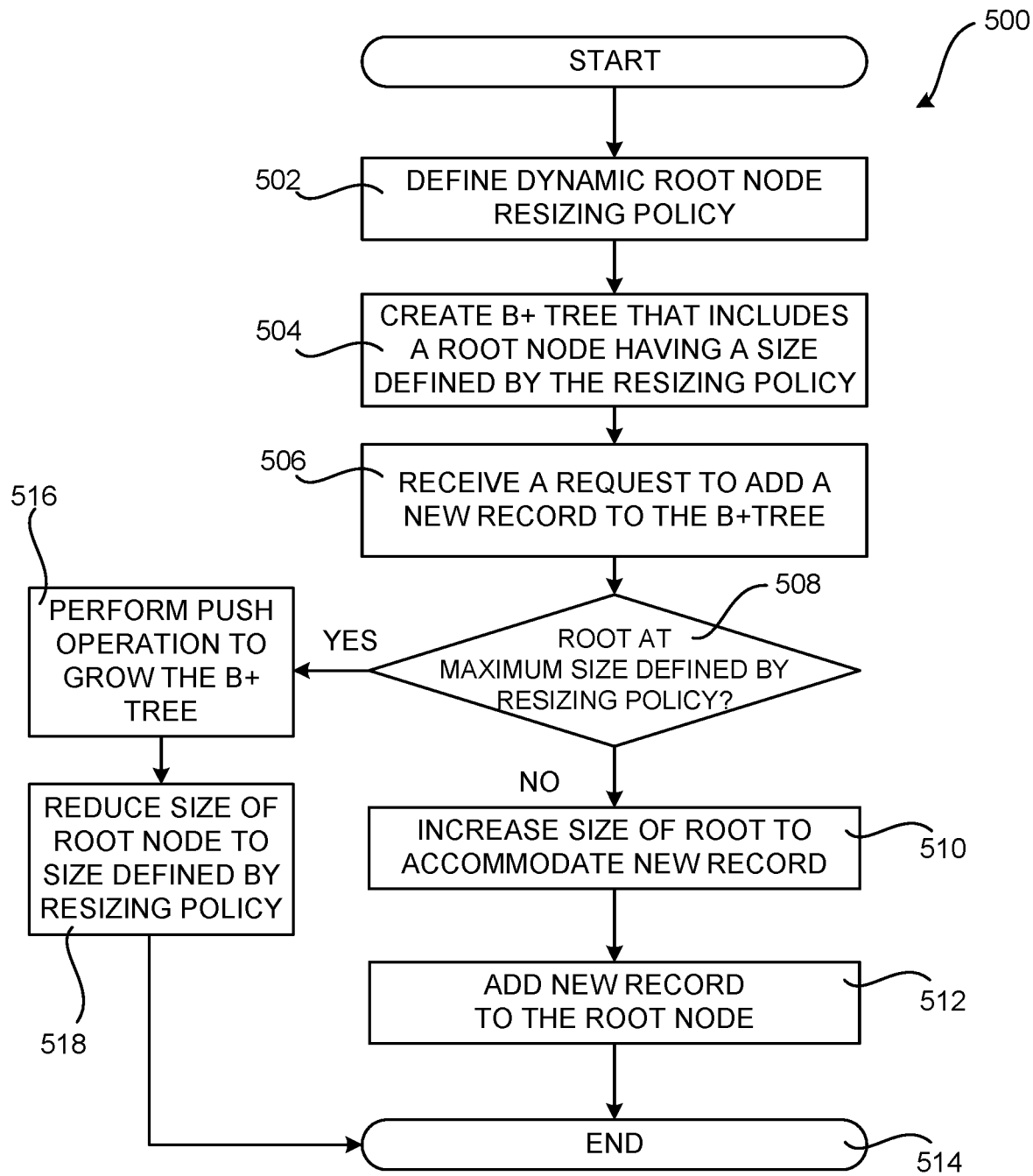
FIG. 5 is a flow diagram showing a routine that illustrates aspects of the example mechanism described with reference to FIGS. 2-4G for dynamically resizing root nodes of B+ trees used to store filesystem metadata.

FIG. 5 is a flow diagram showing a routine 500 that illustrates aspects of the example mechanism described above with reference to FIGS. 2-4G for dynamically resizing root nodes 402 of B+ trees 400 used to store filesystem metadata. The routine 500 begins at operation 502, where the dynamic root node resizing policy 206 is defined. As discussed above, the dynamic root node resizing policy 206 defines an initial root size, a maximum root size, and a minimum root size for root nodes 402 in the B+ trees 400 managed by the filesystem manager 202, in an embodiment. The dynamic root node resizing policy 206 defines other sizes in other embodiments such as, for example, an amount by which a root node 402 is to be grown each time a new record is added to the root node 402.

From operation 502, the routine 500 proceeds to operation 504, where the B+ tree manager 204 creates a new B+ tree 400 that includes a root node 402 having a predefined initial size that is defined by the dynamic root node resizing policy 206. The routine 500 then proceeds from operation 504 to operation 506, where the B+ tree manager 204 receives a request to add a new record 404 to the B+ tree 400. Such a request might be received from the filesystem manager 202, for instance.

From operation 506, the routine 500 proceeds to operation 508, where the B+ tree manager 204 determines whether the current size of the root node 402 of the B+ tree 400 has reached the predefined maximum size defined by the dynamic root node resizing policy 206. If the current size of the root node 402 has reached the predefined maximum size, the routine 500 proceeds from operation 508 to operation 510, where the B+ tree manager 204 increases the size of the root node to accommodate the new record 404 to be added to the root node 402. The routine 500 then proceeds from operation 512, where the new record 404 is added to the root node 402. The routine 500 then proceeds from operation 512 to operation 514, where it ends.

If, at operation 508, the B+ tree manager 204 determines that the current size of the root node 402 of the B+ tree 400 has reached the predefined maximum size defined by the dynamic root node resizing policy 206, the routine 500 proceeds from operation 508 to operation 516. At operation 516, the B+ tree manager 204 performs a push operation to grow the B+ tree 400 in the manner described above. For instance, additional child nodes can be added to the B+ tree 400 and records moved from the root node 402 to the newly added child nodes in the manner discussed above with regard to FIG. 4G.

Once the push operation has completed, the routine 500 proceeds from operation 516 to operation 518, where the B+ tree manager 204 reduces the size of the root node 402 to the predefined minimum size specified by the dynamic root node resizing policy 206. The routine 500 then proceeds from operation 518 to operation 514, where it ends.

Figure 6:
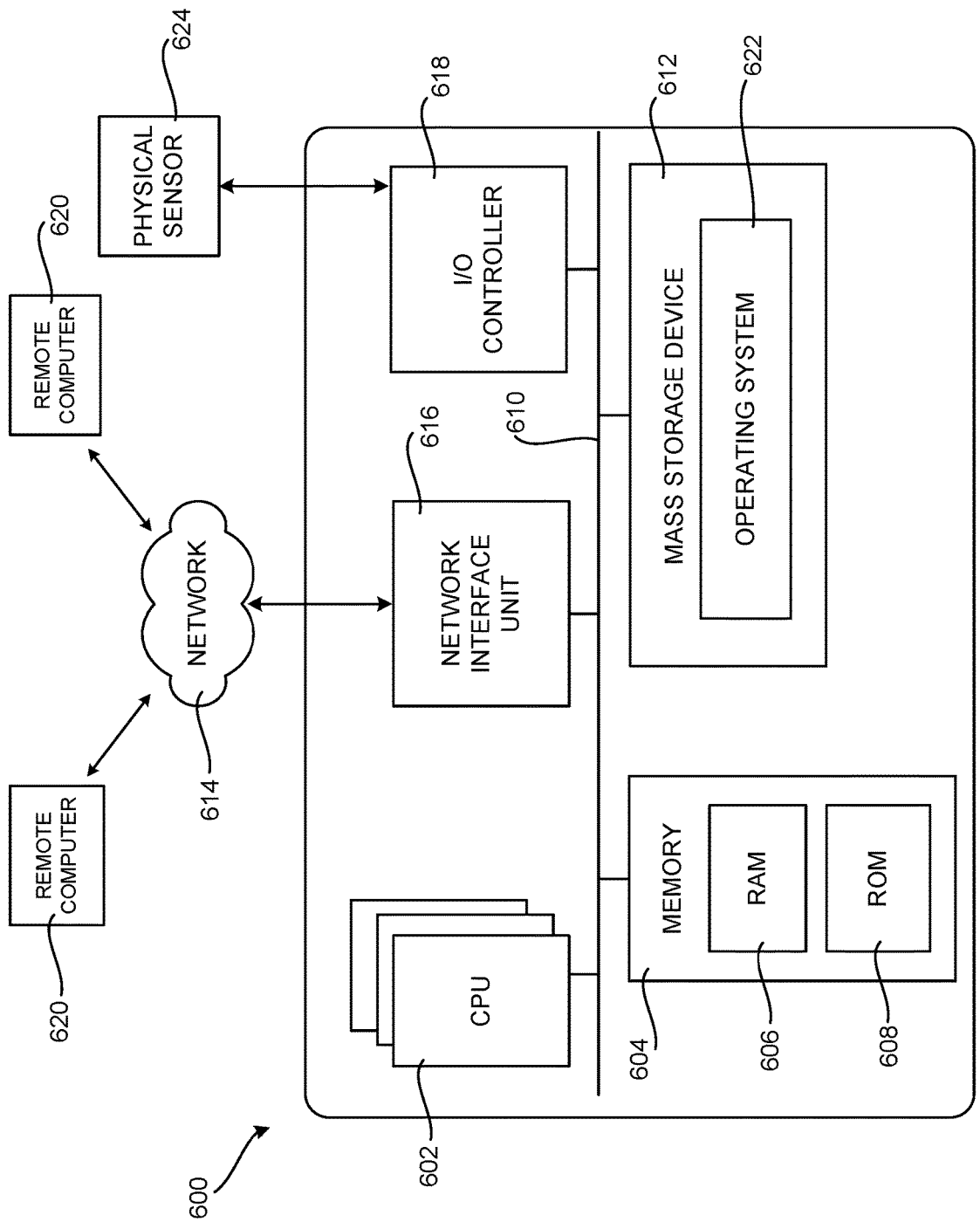
FIG. 6 is a computer architecture diagram showing an illustrative computer hardware and software architecture for a processing system that implements aspects of the technologies presented herein.

FIG. 6 is a computer architecture diagram showing an illustrative computer hardware and software architecture for a system 600 that implements the various technologies presented herein, according to embodiments. The architecture illustrated in FIG. 6 is utilized to implement the processing system 200, aspects of which were described above with respect to FIG. 2, in an embodiment disclosed herein.

The system 600 illustrated in FIG. 6 includes one or more central processing units ("CPUs"), a system memory 604, including a random-access memory 606 ("RAM") and a read-only memory ("ROM") 608, and a system bus 610 that couples the system memory 604 to other components in the system 600. A firmware (not shown in FIG. 6) containing the basic routines that help to transfer information between elements within the system 600, such as during startup, is stored in the ROM 608, in embodiments.

The system 600 further includes a mass storage device 612 for storing an OS 622, application programs, and other types of programs, some of which have been described herein. The mass storage device 612 is also configured to store other types of programs and data, in other embodiments.

The mass storage device 612 is connected to the CPUs 602 through a mass storage controller (not shown in FIG. 6) connected to the bus 610. The mass storage device 612 and its associated computer readable media provide non-volatile storage for the system 600. Although the description of computer readable media contained herein refers to a mass storage device, such as a hard disk, Compact Disk Read-Only Memory ("CD-ROM") drive, Digital Versatile Disc-Read Only Memory ("DVD-ROM") drive, or Universal Serial Bus ("USB") storage key, computer readable media is any available computer-readable storage media or communication media that is accessible by the system 600.

Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, communication media includes wired media such as a wired network or direct-wired connection, and wireless media such as acoustic, radio frequency, infrared and other wireless media. Combinations of the any of the above are also included within the scope of computer readable media.

By way of example, computer-readable storage media includes volatile and non-volatile, removable and non-removable media implemented in any method or technology for storage of information such as computer readable instructions, data structures, program modules, or other data. For example, computer-readable storage media includes RAM, ROM, erasable programmable ROM ("EPROM"), electrically EPROM ("EEPROM"), flash memory or other solid-state memory technology, CD-ROM, DVD-ROM, HD-DVD, BLU-RAY®, or other optical storage, magnetic cassettes, magnetic tape, magnetic disk storage or other magnetic storage devices, or any other medium that stores the desired information and which is accessible to the system 600. For purposes of the claims, the phrase "computer-readable storage medium," and variations thereof, does not include waves or signals per se or communication media.

According to various configurations, the system 600 operates in a networked environment using logical connections to remote computers 620 through a network such as the network 614. The system 600 connects to the network 614 through a network interface unit 616 connected to the bus 610. The network interface unit 616 is utilized to connect to other types of networks and remote computer systems, in some embodiments.

The system 600 also includes an input/output controller 618 for receiving and processing input from a number of other devices, including a keyboard, mouse, touch input, an electronic stylus (none of which are shown in FIG. 6), or a physical sensor 624, such as a video camera. Similarly, the input/output controller 618 provides output to a display screen or other type of output device (also not shown in FIG. 6), in embodiments.

The software components described herein, when loaded into the system 600 and executed, transform the system 600 from a general-purpose computing device into a special-purpose processing system customized to facilitate the functionality presented herein. More specifically, the system 600 operates as a finite-state machine in response to executable instructions contained within the software modules disclosed herein, in embodiments. These computer-executable instructions transform the system 600 by specifying how the system 600 transitions between states, thereby transforming the transistors or other discrete hardware elements constituting the system 600.

Encoding the software modules presented herein also transforms the physical structure of the computer readable media presented herein. The specific transformation of physical structure depends on various factors, in different implementations of this description. Examples of such factors include, the technology used to implement the computer readable media, whether the computer readable media is characterized as primary or secondary storage, and the like.

For example, if the computer readable media is implemented as semiconductor-based memory, the software disclosed herein is encoded on the computer readable media by transforming the physical state of the semiconductor memory. For instance, the software transforms the state of transistors, capacitors, or other discrete circuit elements constituting the semiconductor memory. The software transforms the physical state of such components in order to store data thereupon.

As another example, the computer readable media disclosed herein is implemented using magnetic or optical technology, in embodiments. In such implementations, the program components presented herein transform the physical state of magnetic or optical media, when the software is encoded therein. These transformations include altering the magnetic characteristics of particular locations within given magnetic media. These transformations also include altering the physical features or characteristics of particular locations within given optical media, to change the optical characteristics of those locations. Other transformations of physical media are possible without departing from the scope and spirit of the present description, with the foregoing examples provided only to facilitate this discussion.

The architecture shown in FIG. 6 for the system 600, or a similar architecture, is suitable for implementing other types of computing devices, including hand-held computers, video game devices, embedded computer systems, mobile devices such as smartphones, tablets, alternate reality ("AR"), mixed reality ("MR"), and virtual reality ("VR") devices, and other types of computing devices known to those skilled in the art. It is also contemplated that the system 600 might not include all of the components shown in FIG. 6, include other components that are not explicitly shown in FIG. 6, or an utilize an architecture completely different than that shown in FIG. 6, according to embodiments.

Figure 7:
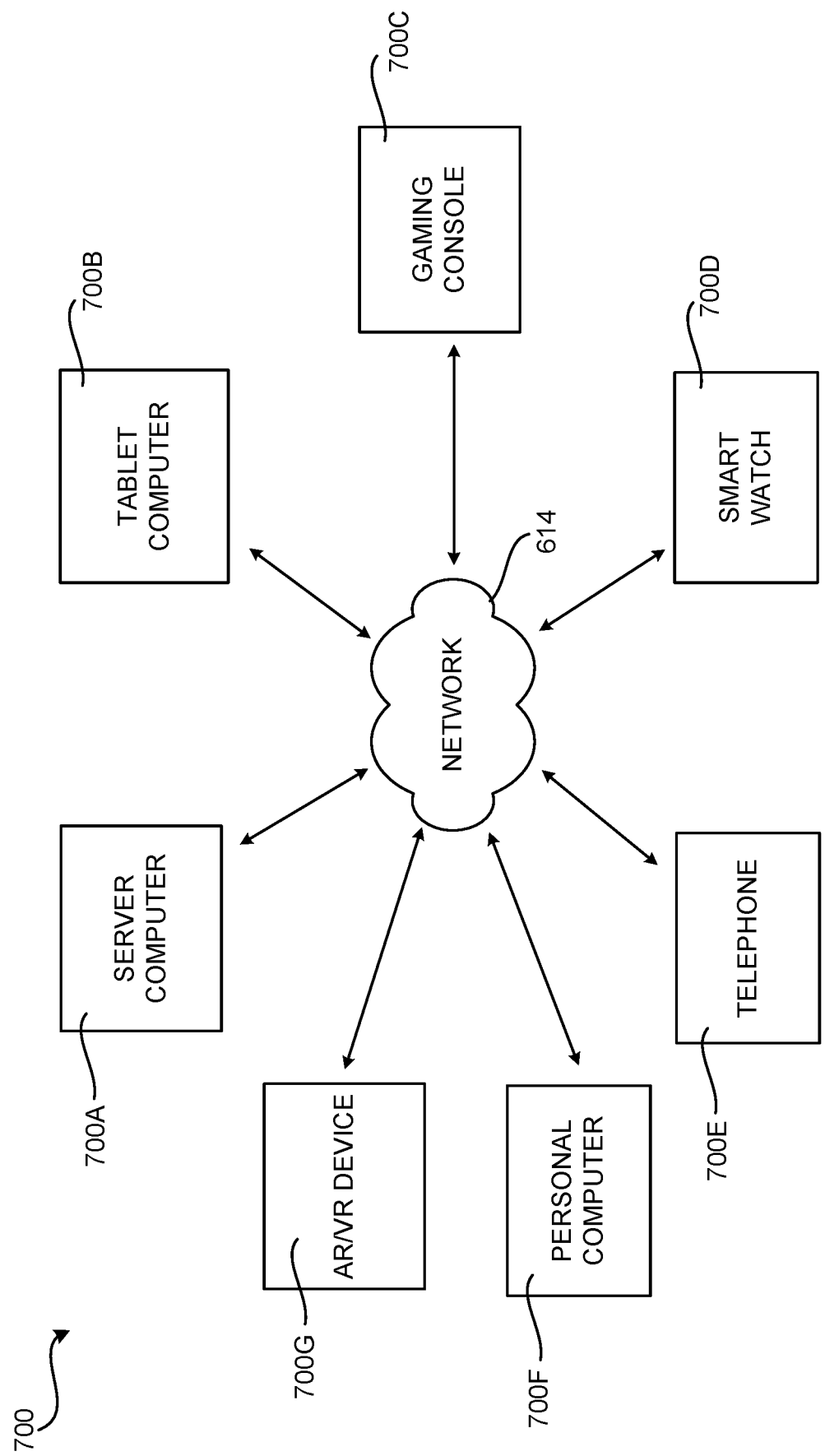
FIG. 7 is a network diagram illustrating an example distributed computing environment in which aspects of the disclosed technologies are implemented.

FIG. 7 is a network diagram showing an illustrative distributed network computing environment 700 in which aspects of the disclosed technologies are implemented, according to various embodiments presented herein. As shown in FIG. 7, one or more server computers 700A are interconnected via a network 614 (which might be any of, or a combination of, a fixed-wire or WLAN, wide-area network ("WAN"), intranet, extranet, peer-to-peer network, VPN, the internet, BLUETOOTH® communication network, proprietary low voltage communication network, or other communication network) with a number of client computing devices such as a tablet computer 700B, a gaming console 700C, a smart watch 700D, a telephone 700E, such as a smartphone, a personal computer 700F, and an AR/VR device 700G.

In a network environment in which the network 614 is the internet, for example, the server computer 700A is a dedicated server computer operable to process and communicate data to and from the client computing devices 700B-700G via any of a number of known protocols, such as, hypertext transfer protocol ("HTTP"), file transfer protocol ("FTP"), or simple object access protocol ("SOAP").

Additionally, the network computing environment 700 utilizes various data security protocols such as secured socket layer ("SSL") or pretty good privacy ("PGP"), in embodiments. Each of the client computing devices 700B-700G is equipped with an OS, such as the OS 622, operable to support one or more computing applications or terminal sessions such as a web browser (not shown in FIG. 7), graphical UI (not shown in FIG. 7), or a mobile desktop environment (not shown in FIG. 7) to gain access to the server computer 700A, in embodiments.

The server computer 700A is communicatively coupled to other computing environments (not shown in FIG. 7) and receives data regarding a participating user's interactions, in embodiments. In an illustrative operation, a user (not shown in FIG. 7) interacts with a computing application running on a client computing device 700B-700G to obtain desired data from the server computer 700A and/or perform other computing applications.

The data and/or computing applications are stored on the server 700A, or servers 700A, and communicated to cooperating users through the client computing devices 700B-700G over the network 614, in embodiments. A participating user (not shown in FIG. 7) requests access to specific data and applications housed in whole or in part on the server computer 700A. These data are communicated between the client computing devices 700B-700G and the server computer 700A for processing and storage.

The server computer 700A hosts computing applications, processes and applets for the generation, authentication, encryption, and communication of data and applications such as those described above with regard to FIGS. 2-5, and cooperates with other server computing environments (not shown in FIG. 7), third party service providers (not shown in FIG. 7), and network attached storage ("NAS") and storage area networks ("SAN") (also not shown in FIG. 7) to realize application/data transactions, in embodiments.

The computing architecture shown in FIG. 6 and the distributed network computing environment shown in FIG. 7 have been simplified for ease of discussion. The computing architecture and the distributed computing network include and utilize many more computing components, devices, software programs, networking devices, and other components not specifically described herein, in various embodiments. Those skilled in the art will also appreciate that the subject matter described herein might be practiced with other computer system configurations other than those shown in FIGS. 6 and 7, including hand-held devices, multiprocessor systems, microprocessor-based or programmable consumer electronics, computing or processing systems embedded in devices (such as wearable computing devices, automobiles, and home automation), minicomputers, mainframe computers, and the like.

The operations of the routines and methods disclosed herein are not presented in any particular order and that performance of some or all of the operations in an alternative order, or orders, is possible and is contemplated. The operations have been presented in the demonstrated order for ease of description and illustration. Operations might be added, omitted, and/or performed simultaneously, without departing from the scope of the appended claims. The illustrated routines and methods might end at any time and need not be performed in their entireties.

Some or all operations of the methods, and/or substantially equivalent operations, are performed by execution of computer-readable instructions included on a computer-readable storage media, as defined herein, in embodiments. The term "computer-readable instructions," and variants thereof, as used herein, is used expansively herein to include routines, applications, application modules, program modules, programs, program components, data structures, algorithms, and the like. Computer-readable instructions are implemented on various system configurations, including single-processor or multiprocessor systems, minicomputers, mainframe computers, personal computers, hand-held computing devices, microprocessor-based, programmable consumer electronics, combinations thereof, and the like.

The logical operations described herein are implemented (1) as a sequence of computer implemented acts or program modules running on a computing system and/or (2) as interconnected machine logic circuits or circuit modules within the computing system, according to embodiments. The implementation is a matter of choice dependent on the performance and other requirements of the computing system. Accordingly, the logical operations described herein are referred to variously as states, operations, structural devices, acts, or modules. These operations, structural devices, acts, and modules are implemented in software, in firmware, in special-purpose digital logic, and any combination thereof, according to embodiments.

For example, the operations illustrated in the sequence and flow diagrams and described herein are implemented in embodiments, at least in part, by modules implementing the features disclosed herein such as a dynamically linked library ("DLL"), a statically linked library, functionality produced by an API, a network service, a compiled program, an interpreted program, a script or any other executable set of instructions. Data is stored in a data structure in one or more memory components. Data is retrieved from the data structure by addressing links or references to the data structure.

The methods and routines described herein might be also implemented in many other ways. For example, the routines and methods are implemented, at least in part, by a processor of another remote computer or a local circuit, in embodiments. In addition, one or more of the operations of the routines or methods are alternatively or additionally implemented, at least in part, by a chipset working alone or in conjunction with other software modules, in embodiments.

The disclosure presented herein also encompasses the subject matter set forth in the following clauses:

Clause 1. A computer-implemented method, comprising: creating a hierarchical data structure representing at least a portion of a filesystem for a storage volume maintained by a processing system, the hierarchical data structure comprising a root node of a predefined initial size; receiving a request to insert a new record into the hierarchical data structure; determining that a current size of the root node is a not a predefined maximum size; and responsive to determining that the current size of the root node is not the predefined maximum size, increasing the current size of the root node to accommodate the new record and adding the new record to the root node.

Clause 2. The computer-implemented method of clause 1, wherein the hierarchical data structure comprises a B+ tree.

Clause 3. The computer-implemented method of any of clauses 1 or 2, wherein the B+ tree defines a streams run table defining a mapping between virtual cluster numbers and logical cluster numbers associated with the storage volume of the processing system.

Clause 4. The computer-implemented method of any of clauses 1-3, wherein the B+ tree is embedded in a file table of the filesystem.

Clause 5. The computer-implemented method of any of clauses 1-4, wherein the hierarchical data structure comprises a file table storing metadata for files in a directory of the filesystem.

Clause 6. The computer-implemented method of any of clauses 1-5, wherein the hierarchical data structure is embedded in a directory table of the filesystem.

Clause 7. The computer-implemented method of any of clauses 1-6, wherein the new record comprises a leaf record.

Clause 8. The computer-implemented method of any of clauses 1-7, wherein the new record comprises a director record.

Clause 9. A computer-readable storage medium having computer-executable instructions stored thereupon which, when executed by a processing system, cause the processing system to: store a hierarchical data structure representing at least a portion of a filesystem for a storage volume maintained by the processing system, the hierarchical data structure comprising at least a root node of a predefined initial size; determine that a current size of the root node of the hierarchical data structure is a predefined maximum size; and responsive to determining that the current size of the root node of the hierarchical data structure is the predefined maximum size, create a new node in the hierarchical data structure, move a record from the root node of the hierarchical data structure to the new node, and reduce the current size of the root node of the hierarchical data structure to a predefined minimum size.

Clause 10. The computer-readable storage medium of clause 9, wherein the hierarchical data structure comprises a B+ tree.

Clause 11. The computer-readable storage medium of any of clauses 9 or 10, wherein the B+ tree comprises a streams run table defining a mapping between virtual cluster numbers and logical cluster numbers associated with the storage volume of the processing system.

Clause 12. The computer-readable storage medium of any of clauses 9-11, wherein the B+ tree is embedded in a file table of the filesystem.

Clause 13. The computer-readable storage medium of any of clauses 9-12, wherein the B+ tree comprises a file table storing metadata for files in a directory of the filesystem.

Clause 14. The computer-readable storage medium of any of clauses 9-13, wherein the B+ tree is embedded in a directory table of the filesystem.

Clause 15. A processing system, comprising: a processor; and a computer-readable storage medium having computer-executable instructions stored thereupon that, when executed, cause the processing system to: store a hierarchical data structure corresponding to a filesystem, the hierarchical data structure comprising at least a root node of a predefined initial size; receive a request to insert a new record into the hierarchical data structure; responsive to receiving the request, determine that a current size of the root node is a predefined maximum size; and responsive to determining that the current size of the root node is not the predefined maximum size, increase the current size of the root node to accommodate the new record and store the new record in the root node.

Clause 16. The processing system of clause 15, wherein the hierarchical data structure comprises a B+ tree.

Clause 17. The processing system of any of clauses 15 or 16, wherein the B+ tree comprises a streams run table embedded in a file table of the filesystem, the streams run table defining a mapping between virtual cluster numbers and logical cluster numbers associated with a storage volume of the processing system.

Clause 18. The processing system of any of clauses claim 15-17, wherein the B+ tree comprises a file table embedded in a directory table of the filesystem, the file table storing metadata for files in a directory of the filesystem.

Clause 19. The processing system of any of clauses 15-18, wherein the new record comprises a leaf record.

Clause 20. The processing system of any of clauses 15-19, wherein the new record comprises a director record.

Technologies for dynamically resizing root nodes of B+ trees storing filesystem metadata have been disclosed herein. Although the subject matter presented herein has been described in language specific to computer structural features, methodological and transformative acts, specific computing machinery, and computer readable media, the subject matter set forth in the appended claims is not limited to the specific features, acts, or media described herein. Rather, the specific features, acts and mediums are disclosed as example forms of implementing the claimed subject matter. Various modifications and changes might be made to the subject matter described herein without following the example configurations and applications illustrated and described. The subject matter described above is provided by way of illustration only and should not be construed as limiting.

What is claimed is:

1. A computer-readable storage medium having computer-executable instructions stored thereupon which, when executed by a processing system, cause the processing system to:
   store a hierarchical data structure representing at least a portion of a filesystem for a storage volume maintained by the processing system, the hierarchical data structure comprising at least a root node with a predefined initial size of allocated storage space;
   receive a request to insert a new record into the hierarchical data structure;
   determine that insertion of the new record into the root node of the hierarchical data structure causes a current size of allocated storage space for the root node of the hierarchical data structure to reach a predefined maximum size; and
   responsive to determining that the insertion of the new record into the root node of the hierarchical data structure causes the current size of the allocated storage space for the root node of the hierarchical data structure to reach the predefined maximum size:
   create a new node in the hierarchical data structure;
   implement a push operation to move at least one record from the root node of the hierarchical data structure to the new node; and
   eliminate unused storage space that has been allocated to the root node of the hierarchical data structure by reducing, in accordance with a dynamic root node resizing policy, the current size of the allocated storage space for the root node of the hierarchical data structure to a minimum size of allocated storage space that is required to store the new record.

2. The computer-readable storage medium of claim 1, wherein the hierarchical data structure comprises a B+ tree.

3. The computer-readable storage medium of claim 2, wherein the B+ tree comprises a streams run table defining a mapping between virtual cluster numbers and logical cluster numbers associated with the storage volume maintained by the processing system.

4. The computer-readable storage medium of claim 3, wherein the B+ tree is embedded in a file table of the filesystem.

5. The computer-readable storage medium of claim 2, wherein the B+ tree comprises a file table storing metadata for files in a directory of the filesystem.

6. The computer-readable storage medium of claim 5, wherein the B+ tree is embedded in a directory table of the filesystem.

7. A computer-implemented method comprising:
   in response to a request to insert a new record into a hierarchical data structure, determining that insertion of the new record into a root node of the hierarchical data structure causes a current size of allocated storage space for the root node of the hierarchical data structure to reach a predefined maximum size, wherein the hierarchical data structure represents at least a portion of a filesystem for a storage volume maintained by the processing system; and
   responsive to determining that the insertion of the new record into the root node of the hierarchical data structure causes the current size of the allocated storage space for the root node of the hierarchical data structure to reach the predefined maximum size:
   creating a new node in the hierarchical data structure;
   implementing a push operation to move at least one record from the root node of the hierarchical data structure to the new node; and
   eliminating unused storage space that has been allocated to the root node of the hierarchical data structure by reducing, in accordance with a dynamic root node resizing policy, the current size of the allocated storage space for the root node of the hierarchical data structure to a minimum size of allocated storage space that is required to store the new record.

8. The computer-implemented method of claim 7, wherein the hierarchical data structure comprises a B+ tree.

9. The computer-implemented method of claim 8, wherein the B+ tree comprises a streams run table defining a mapping between virtual cluster numbers and logical cluster numbers associated with the storage volume maintained by the processing system.

10. The computer-implemented method of claim 9, wherein the B+ tree is embedded in a file table of the filesystem.

11. The computer-implemented method of claim 8, wherein the B+ tree comprises a file table storing metadata for files in a directory of the filesystem.

12. The computer-implemented method of claim 11, wherein the B+ tree is embedded in a directory table of the filesystem.

13. A system, comprising:
   a processor; and
   a computer-readable storage medium having computer-executable instructions stored thereupon that, when executed, cause the processor to perform operations comprising:
   determining, in response to a request to insert a new record into a hierarchical data structure, that insertion of the new record into a root node of the hierarchical data structure causes a current size of allocated storage space for the root node of the hierarchical data structure to reach a predefined maximum size, wherein the hierarchical data structure represents at least a portion of a filesystem for a storage volume maintained by the system; and
   responsive to determining that the insertion of the new record into the root node of the hierarchical data structure causes the current size of the allocated storage space for the root node of the hierarchical data structure to reach the predefined maximum size:
   creating a new node in the hierarchical data structure;
   implementing a push operation to move at least one record from the root node of the hierarchical data structure to the new node; and
   eliminating unused storage space that has been allocated to the root node of the hierarchical data structure by reducing, in accordance with a dynamic root node resizing policy, the current size of the allocated storage space for the root node of the hierarchical data structure to a minimum size of allocated storage space that is required to store the new record.

14. The system of claim 13, wherein the hierarchical data structure comprises a B+ tree.

15. The system of claim 14, wherein the B+ tree comprises a streams run table defining a mapping between virtual cluster numbers and logical cluster numbers associated with the storage volume maintained by the processing system.

16. The system of claim 15, wherein the B+ tree is embedded in a file table of the filesystem.

17. The system of claim 14, wherein the B+ tree comprises a file table storing metadata for files in a directory of the filesystem.

18. The system of claim 17, wherein the B+ tree is embedded in a directory table of the filesystem.

* * * * *